United States Patent [19]
> Heidacker

[11] 3,799,434
[45] Mar. 26, 1974

[54] EXHAUST PIPE MOUNTED RISER VALVE
[75] Inventor: Walter C. Heidacker, Bloomfield Hills, Mich.
[73] Assignee: General Motors Corporation, Detroit, Mich.
[22] Filed: Mar. 2, 1973
[21] Appl. No.: 337,674

[52] U.S. Cl................ 236/101, 251/305, 285/199
[51] Int. Cl. ........................................ G05d 23/08
[58] Field of Search ...... 236/101, 102, 87; 285/199; 251/305

[56] References Cited
UNITED STATES PATENTS
| 3,406,903 | 10/1968 | Kidder | 236/102 |
| 2,826,435 | 3/1958 | Shustack | 285/199 |
| 2,819,025 | 1/1958 | Else et al. | 236/101 C |
| 3,210,004 | 10/1965 | Hunt et al. | 236/101 C |
| 2,705,158 | 3/1955 | Risley | 285/199 |
| 3,331,622 | 7/1967 | Bagnulo | 285/199 |
| 3,430,697 | 3/1969 | Wellstein | 285/199 |

Primary Examiner—William E. Wayner
Assistant Examiner—William E. Tapoleai, Jr.
Attorney, Agent, or Firm—Peter D. Sachtjen

[57] ABSTRACT

A heat riser valve for an internal combustion engine is carried on a saddle and U-bolt clamp which is conformable to and directly mounted at a readily accessible location on the thin wall exhaust pipe leading from the engine. The saddle and the exhaust pipe include coinciding valve receiving slots for admitting the valve plate of the heat riser valve. The clamp trues the exhaust pipe diameter to permit minimum diametral clearance between the valve plate and the inner diameter of the exhaust pipe.

1 Claim, 4 Drawing Figures

PATENTED MAR 26 1974 3,799,434

EXHAUST PIPE MOUNTED RISER VALVE

This invention relates to fluid flow control valves and, in particular, to an attachment for mounting a heat riser valve directly on an engine exhaust pipe.

Heat riser valves are used on internal combustion engines for directing a portion of the engine exhaust gases to a heat exchanger in the intake manifold during engine warmup. This resultant heating of entering liquid fuel droplet promotes more complete fuel vaporization for improved engine operation. The heat riser valve is conventionally mounted at the exhaust manifold. The valve serves to block the free flow of exhaust gases therethrough during engine warmup. This blocking routes the exhaust gases through a crossover passage in the intake manifold for the aforementioned heat exchange. The heat riser valve includes a thermally controlled actuator for gradually opening the valve as engine temperature rises. After predetermined warmup, the valve assumes a position causing minimum obstruction to the free flow of exhaust gases.

The heat riser valve being disposed within the engine exhaust stream conduit is subject to various contaminants in the exhaust gases. The contaminants and the high exhaust temperatures may cause seizure of the valve actuating mechanism and a resultant loss of exhaust gas flow control.

Where the heat riser valve is mounted within or adjacent the exhaust manifold as part of a separate assembly, repair or replacement of the valve requires disassembly of the exhaust system. The servicing of such a defective valve was simplified by the heat riser valve mounting of Kidder U.S. Pat. No. 3,406,903, assigned to the assignee of the present invention. Therein, the valve was disposed in the exhaust line through an access slot at the outlet of the exhaust manifold. The valve assembly was bolted onto a flat wall of the manifold and could be removed for repair or replacement without disassembly of the system. However, the system required special adaptation of the relatively bulky manifold and provided for mounting in a location not readily accessible on current vehicles.

The heat riser valve mounting arrangement, according to the present invention, provides even greater simplicity and serviceability than the Kidder mounting. The valve is directly mountable on the exhaust pipe at any convenient axial and radial location. The valve may be removed for servicing or replacement without requiring disassembling of the exhaust system. The only modification in the entire exhaust system is a single easily formed valve access slot on the exhaust pipe. More specifically, the heat riser valve is carried on a split mounting saddle and U-bolt clamp. The saddle has a cylindrical surface conformable to the true diameter of the exhaust pipe and includes a longitudinal slot which coincides with a companion slot formed at any convenient axial and radial location on the exhaust pipe. The valve plate is inserted through these slots. A U-bolt having an arcuate surface conformable to the true diameter of the exhaust pipe clamps the saddle against the pipe. Inasmuch as the wall of the pipe is relatively thin and subject to non-circular cross sectional variations, binding of the valve plate in the pipe could occur. This is avoided by the present clamp wherein the U-bolt and saddle will reform the pipe to its true diameter. This will permit a minimum diametral clearance between the valve plate and the inner diameter of the exhaust pipe for more effective flow control. Such a heat riser valve is readily removed for servicing or replacement merely by removal from the clamp.

The above and other features of the present invention will be apparent to one skilled in the art upon reading the following detailed description, reference being made to the accompanying drawings illustrating a preferred embodiment of the present invention in which.

Figure 1:
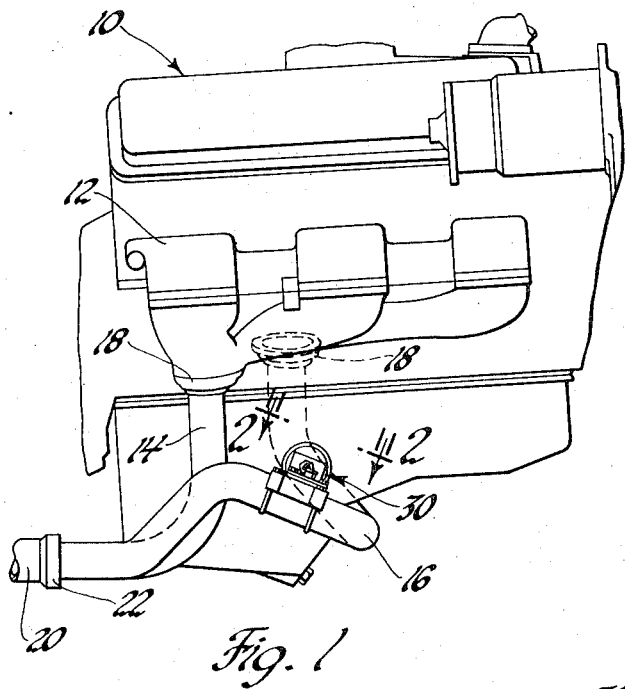
FIG. 1 is a side elevational view of an internal combustion engine having an exhaust pipe mounted heat riser valve made in accordance with the present invention.

Referring to FIG. 1, a conventional V-type internal combustion engine 10 includes exhaust manifolds 12 on either side thereof. A pair of branch exhaust pipes 14, 16 are connected to the outlets 18 of the exhaust manifolds 12. The branch exhaust pipes 14, 16 are commonly connected to a primary exhaust pipe 20 at a coupling 22. In the illustrated arrangement, the branch exhaust pipe 16 passes under the engine 10 an for future reference is designated as the crossover pipe.

The engine 10 includes an intake manifold having a crossover passage (not shown). Exhaust gases are routed through the crossover passage as controlled by the hereinafter described heat riser valve. This serves to warm a heat exchanger in the manifold to increase vaporization of fuel during engine warmup.

The heat riser valve 30 is mounted on the crossover pipe 16. The heat riser valve 30 is operable to block exhaust gas flow through the crossover pipe 16 during engine warmup. This blocking routes the exhausts through the crossover passage for warming the aforementioned heat exchanger. The valve 30 gradually opens to provide a substantially unrestricted exhaust gas flow through the pipe 16 at a predetermined engine temperature.

Figure 2:
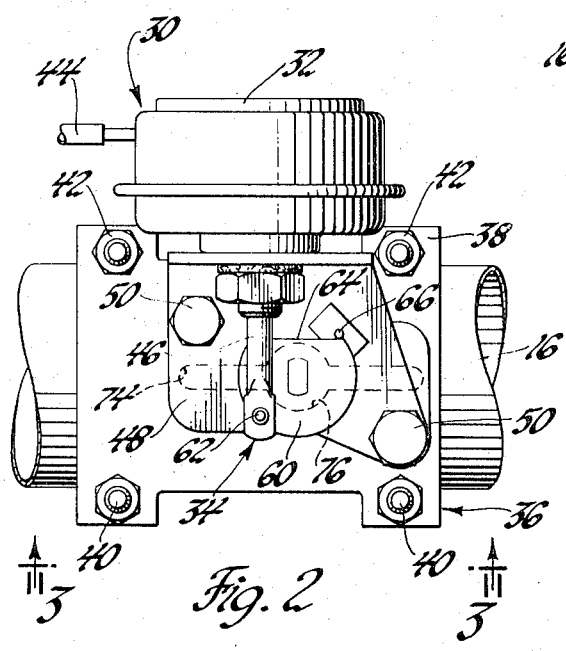
FIG. 2 is a view taken along line 2—2 of FIG. 1, showing the disposition of the heat riser valve with respect to the access slots.
Figure 3:
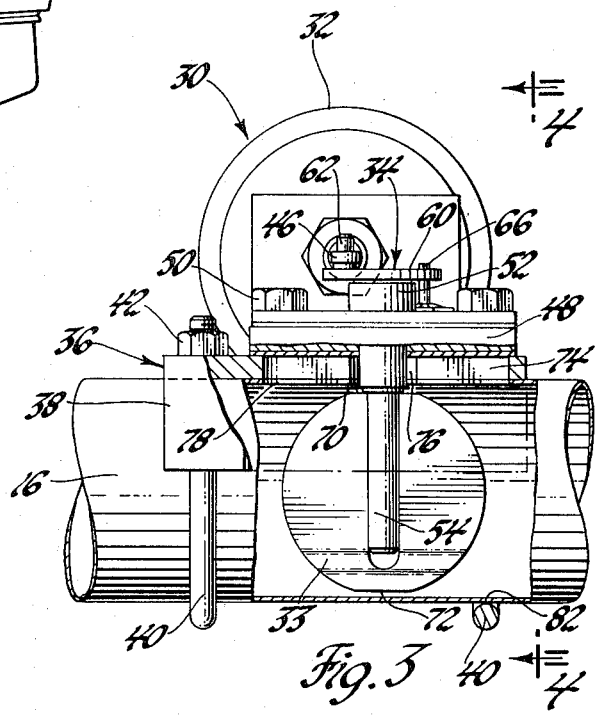
FIG. 3 is a partially sectioned side view taken along line 3—3 of FIG. 2 showing the heat riser valve and the valve plate in the open position.
Figure 4:
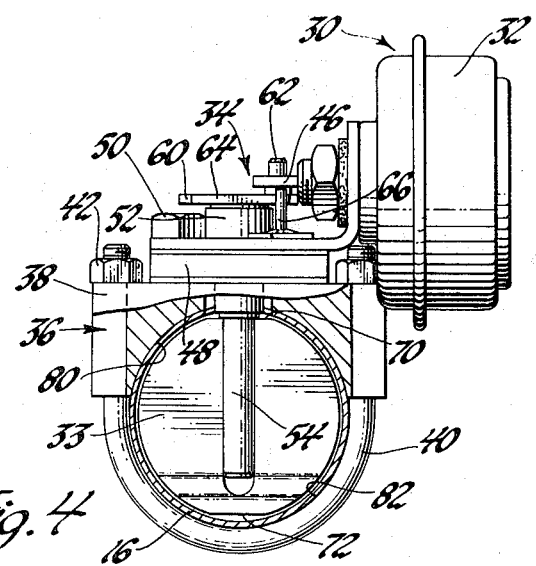
FIG. 4 is a view taken along line 4—4 of FIG. 3 showing the valve plate in the closed position.

More particularly, as shown in FIGS. 2 through 4, the heat riser valve 30 includes a vacuum motor 32, a rotatable valve plate 33, valve actuating mechanism 34 and a mounting and sizing clamp 36. The clamp 36 includes a mounting saddle 38 and a pair of U-bolts 40. The U-bolts are clamped to the saddle 38 and against the pipe 16 by nuts 42.

The vacuum motor 32 is a conventional diaphragm operated servo unit. The vacuum motor 32 is connected to a source of engine vacuum by a line 44. The diaphragm of the vacuum motor is connected to an output shaft 46. At engine startup, the output shaft 46 is drawn inwardly by the diaphragm as the latter is subjected to vacuum pressure on one side thereof. A suitable thermostatic bimetal valve opens in accordance with engine temperature to decrease the vacuum pressure at the motor 32. As a result of the decreasing vacuum pressure, an internal spring biases the diaphragm to extend the output shaft 46 in accordance with engine temperature rise. Alternatively, the operation of the valve could be controlled by a spiral bimetallic spring.

The valve actuating mechanism 34 includes a mounting plate 48 secured to the saddle 38 by nuts 50, and a bushing 52 rotatably housing a valve shaft 54 on which the valve plate 33 is mounted. The valve plate 33 is disposed interior of the pipe 16 through access slots described below. A circular crank 60 is mounted at the upper end of the shaft 54. The output shaft 46 is connected to the outer periphery of the crank 60 by a pin 62. The crank 60 includes a flat surface 64 which engages a stop pin 66 fixed to the plate 48 to limit opening and closing movement of the valve plate 33.

With this arrangement, as vacuum is applied to the motor 32 via line 44, the output shaft 46 is drawn inwardly against the biasing of the internal spring thereby rotating the shaft 54 and the valve plate 33 clockwise. This causes the valve plate 33 to assume a blocking position transverse to the pipe 16 as shown in FIG. 4. The stop pin 66 engages the other side of the flat 64 on the crank 60 to prevent further rotation.

The valve plate 33 is substantially circular with the exception of flats 70 and 72 at the upper and lower margins thereof. The plate 33 has an outer diameter having a slight clearance with respect to the true inside diameter of the exhaust pipe 16. Being a thin wall construction, the pipe cross section as formed is subject to non-circular variations along the length thereof.

The saddle 38 as shown in FIGS. 2 and 3 includes an elongated axially or longitudinally disposed access slot 74 having a length slightly longer than the diameter of the valve plate 33. The slot 74 includes a center circular section 76 having a diameter slightly larger than the upper portion of the shaft 54. The pipe 16 includes companion axial valve access slot 78 which coincides with the slot 74 in the mounting saddle 38. This permits the mounting saddle 38 and the heat riser valve 30 to be positioned on the pipe 16 with the valve plate 33 operatively disposed therewithin. The slot 78 may be located at any conveniently accessible axial and radial position on the pipe 16 to facilitate installation and servicing of the unit.

As shown in FIG. 4, the mounting saddle 38 includes a right cylindrical surface 80 which engages the outer surface of the crossover pipe 16 for substantially 180° of the circumference thereof. The surface 80 has a diameter equal to the true diameter of the pipe 16. The U-bolts have lower circular mounting surfaces 82 which engage the lower surface of the pipe 16 for substantially the remaining 180° of the circumference thereof. The surfaces 82 have diameter equal to the true diameter of the exhaust pipe 18. The contour surfaces 80 and 82 upon tightening of the nuts 42 will substantially engage the entire periphery will reform the exhaust pipe 16 to its true diameter regardless of its initial non-circular cross section. This truing of the pipe will ensure a circular inner surface which will permit selection of a valve plate 33 having a minimum diametral clearance with respect to the inner surface thereof to provide effective exhaust gas flow control.

In operation, as the engine 10 is started the vacuum applied to the motor 32 will retract the output shaft 46. This causes the output valve shaft 54 and the valve plate 33 to rotate counterclockwise to the closed position shown in FIG. 4. This blocks the flow of exhaust gases therethrough so as to route the blocked gases through the crossover passage for the aforementioned heating purposes. As the engine temperature rises, the vacuum applied to the motor 32 is reduced. This causes the output shaft 46 to extend gradually until the valve plate 33 assumes a fully opened position at a predetermined temperature to present a minimum obstruction to the free flow of exhaust gases through the pipe 16.

In the event of failure of the valve due to sticking or other reasons, the valve 30 is easily removed merely by removing the nuts 50 at the mounting plate 48 and radially withdrawing the valve plate 33 upwardly through the access slots 74, 78. The valve 30 may then be serviced or repaired and reattached to the pipe 16 without requiring any disassembly of the exhaust system.

Although only one form of this invention has been shown and described, other forms will be readily apparent to those skilled in the art. Therefore, it is not intended to limit the scope of this invention by the embodiments selected for the purpose of this disclosure but only by the claim which follows.

What is claimed is:

1. A heat riser valve attachment for an internal combustion engine comprising, in combination: a thin wall exhaust pipe extending from said engine, said exhaust pipe having a circular true diameter and being subject to non-circular cross sectional variations along the length thereof; a heat riser valve including a cantilevered circular valve plate, said valve plate being actuated in accordance with engine temperature to move between a longitudinally open position and a transverse closed position, said valve plate having a minimal clearance with respect to the true inner diameter of said exhaust pipe; a clamp assembly comprising a first member having a cylindrical surface conformable to the true diameter of said exhaust pipe and engaging substantially 180° of the circumference thereof; a longitudinal valve access slot formed in said first member; a longitudinal valve access slot formed at a desired axial and radial position on said exhaust pipe; a second member on said clamp assembly having a surface conformable to the true diameter of said exhaust pipe and engaging substantially the remaining 180° of the circumference thereof; means for clamping said first member to said exhaust pipe with said slots commonly aligned, said clamping causing said surfaces to engage substantially the entire periphery of the pipe thereby reforming the exhaust pipe to said true diameter to eliminate said non-circular cross sectional variations and permit the use of a valve plate having said minimum clearance with respect to the inner diameter of said pipe; and means for mounting said assembly on said first member with said valve plate extending through said slots and operatively disposed interior of said exhaust pipe.

* * * * *

PO-1050
(5/69)

UNITED STATES PATENT OFFICE
CERTIFICATE OF CORRECTION

Patent No. 3,799,434   Dated March 26, 1974

Inventor(s) Walter C. Heidacker

It is certified that error appears in the above-identified patent and that said Letters Patent are hereby corrected as shown below:

Title page, title, "Exhaust Pipe Mounted Riser Valve" should read -- Exhaust Pipe Mounted Heat Riser Valve --.

Column 1, line 1, "Exhaust Pipe Mounted Riser Valve" should read -- Exhaust Pipe Mounted Heat Riser Valve --.

Column 2, line 28, "an" should read -- and --.

Signed and sealed this 29th day of October 1974.

(SEAL)
Attest:

McCOY M. GIBSON JR.
Attesting Officer

C. MARSHALL DANN
Commissioner of Patents